(12) United States Patent
Stolbikov et al.

(10) Patent No.: US 11,863,683 B2
(45) Date of Patent: Jan. 2, 2024

(54) METHOD AND DEVICE FOR PROVIDING COMMUNICATION PATH

(71) Applicant: LENOVO (SINGAPORE) PTE. LTD, New Tech Park (CN)

(72) Inventors: Igor Stolbikov, Apex, NC (US); Nathan Peterson, Oxford, NC (US); John M. Petersen, Wake Forest, NC (US); Gary D. Cudak, Wake Forest, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 196 days.

(21) Appl. No.: 17/447,409

(22) Filed: Sep. 10, 2021

(65) Prior Publication Data

US 2023/0085059 A1    Mar. 16, 2023

(51) Int. Cl.
*H04L 9/32* (2006.01)
*H04L 9/40* (2022.01)
*H04L 9/30* (2006.01)
*H04L 9/08* (2006.01)

(52) U.S. Cl.
CPC ........... *H04L 9/3228* (2013.01); *H04L 9/085* (2013.01); *H04L 9/0891* (2013.01); *H04L 9/30* (2013.01); *H04L 63/0838* (2013.01); *H04L 63/0846* (2013.01)

(58) Field of Classification Search
CPC ..... H04L 9/3228; H04L 9/085; H04L 9/0891; H04L 9/30; H04L 63/0838; H04L 63/0846; H04L 9/3213; H04L 63/00; H04L 9/3013
See application file for complete search history.

(56) References Cited

U.S. PATENT DOCUMENTS

| | | | | |
|---|---|---|---|---|
| 7,571,489 | B2 * | 8/2009 | Ong | G06F 21/34 726/29 |
| 8,341,704 | B2 * | 12/2012 | Cowham | H04L 63/102 726/5 |
| 9,002,750 | B1 * | 4/2015 | Chu | H04W 12/04 705/72 |
| 10,068,082 | B1 * | 9/2018 | Zheng | G06F 21/45 |
| 11,153,310 | B2 * | 10/2021 | Gramza | H04L 63/083 |

(Continued)

*Primary Examiner* — J. Brant Murphy
(74) *Attorney, Agent, or Firm* — Dean D. Small; The Small Patent Law Group, LLC (57) ABSTRACT

A computer implemented method for providing a communication path is provided. The method includes to determine, with a receiving device, a shared secret based on a receiving device private key and an electronic device public key communicated to the receiving device over a network, and determine, with the electronic device, the shared secret based on an electronic device private key and a receiving device public key communicated to the electronic device over the network. The method also includes to determine, with the receiving device, an identifier of the receiving device based on the shared secret, and determine, with the electronic device, a time-based one-time password (TOTP) based on the shared secret. The method also includes to obtain a token based on the TOTP, communicate the token from the electronic device to the receiving device based on the identifier, and provide a communication path between the receiving device and electronic device based on the token.

19 Claims, 3 Drawing Sheets

(56) References Cited

U.S. PATENT DOCUMENTS

| | | | |
|---|---|---|---|
| 2006/0288405 A1* | 12/2006 | Albisu | G06Q 20/388 |
| | | | 726/8 |
| 2009/0288143 A1* | 11/2009 | Stebila | G06F 21/445 |
| | | | 726/3 |
| 2010/0180324 A1* | 7/2010 | Karur | G06F 21/31 |
| | | | 726/6 |
| 2018/0006819 A1* | 1/2018 | Watanabe | H04L 63/0428 |
| 2019/0052627 A1* | 2/2019 | Ferreira | H04L 63/0876 |
| 2020/0052905 A1* | 2/2020 | Mathias | H04L 9/006 |
| 2021/0258162 A1* | 8/2021 | Le Saint | H04L 9/14 |
| 2022/0109674 A1* | 4/2022 | Avetisov | H04L 9/088 |

* cited by examiner

METHOD AND DEVICE FOR PROVIDING COMMUNICATION PATH

BACKGROUND

Embodiments herein generally relate to methods and systems for dynamically changing the identification of a server and/or ports in a mesh network based on an internal secret.

Conventionally, edge servers and Internet of Things ("IOT") devices, or electronic devices that access the Internet through a network, are deployed in a public network where the edge servers communicate with the IOT devices over the public network. As examples, cameras can be deployed with internet access, smart grid devices that similarly have internet access, remote monitoring of assets, virtualized radio networks and 5G, cloud gaming systems, autonomous vehicles, etc. all present access points to the public network.

Because IOT devices and accompanying systems include direct internet access, significant security risks are presented in the form of surface attacks from hackers. In particular, any hacker may use the public network in an attempt to access the edge servers or IOT devices to obtain user information. As the number of these system grow in magnitudes, so do the risks associated from these surface attacks.

SUMMARY

In accordance with embodiments herein, a computer implemented method for providing a communication path is provided. The method is under control of one or more processors including program instructions to determine, with a receiving device, a shared secret based on a receiving device private key and an electronic device public key communicated to the receiving device over a network, and determine, with the electronic device, the shared secret based on an electronic device private key and a receiving device public key communicated to the electronic device over the network. The method also includes to determine, with the receiving device, an identifier of the receiving device based on the shared secret, and determine, with the electronic device, a time-based one-time password (TOTP) based on the shared secret. The method also includes to obtain a token based on the TOTP, communicate the token from the electronic device to the receiving device based on the identifier, and provide a communication path between the receiving device and electronic device based on the token.

Optionally, the identifier of the receiving device is also based on a determined time period. In one aspect, under the control of the one or more processors including program instructions further to obtain, with the receiving device, the receiving device private key associated with the shared secret, and obtain, with the electronic device, an electronic device private key associated with the shared secret. The method also includes to obtain, with the receiving device from an electronic device over the network, the electronic device public key associated with the shared secret, and obtain, with the electronic device from the receiving device over the network, the receiving device public key associated with the shared secret. In another aspect, under the control of the one or more processors including program instructions further to update, with the receiving device, the identifier of the receiving device to provide an updated identifier after a determined period of time, determine, with the electronic device, an updated TOTP based on the updated identifier of the receiving device, communicate an updated token from the electronic device to the receiving device based on the updated TOTP, and provide an updated communication path between the receiving device and electronic device based on the updated token. In one example, under the control of the one or more processors including program instructions further to repeat the update step. In another example, to determine, with the receiving device, an identifier of the receiving device based on the shared secret includes generating a machine based name. In yet another example, to determine, with the receiving device, an identifier of the receiving device based on the shared secret includes associated the shared secret with terms in a dictionary, and generating a word based name. In one embodiment, to obtain the token based on the TOTP include providing a threshold number of attempts to input the TOTP to obtain the token.

In accordance with embodiments herein, a system is provided that has an electronic device including a user interface, a memory storing program instructions, and one or more processors. When executing the program instructions the one or more processors are configured to determine a shared secret based on an electronic device private key and a receiving device public key communicated to the electronic device over a network, generate a token from an identifier of the receiving device based on the shared secret, and communicate the token to a receiving device. The receiving device includes a memory storing program instructions, and one or more processors. When executing the program instructions the one or more processors are configured to determine, the shared secret based on a receiving device private key and an electronic device public key communicated to the receiving device over the network, determine the identifier of the receiving device based on the shared secret, and provide a communication path through the network between the receiving device and the electronic device based on receiving the token.

Optionally, the identifier of the receiving device is also based on a determined time period. In one aspect, the identifier of the receiving device is at least one of a name of the receiving device, or a name of a port of the receiving device. In another aspect, the identifier is at least one of machine based, or word based. In one example, the one or more processors of the electronic device are further configured to obtain an electronic device private key associated with the shared secret, and obtain from the receiving device over the network the receiving device public key associated with the shared secret. In another example, the one or more processors of the receiving device are further configured to obtain the receiving device private key associated with the shared secret, and obtain from an electronic device over the network the electronic device public key associated with the shared secret. In yet another example, the one or more processors of the receiving device are further configured to update the identifier of the receiving device to provide an updated identifier after a determined period of time. In one embodiment, the one or more processors of the electronic device are further configured to determine an updated TOTP based on the updated identifier of the receiving device, and communicate an updated token from the electronic device to the receiving device based on the updated TOTP.

In accordance with embodiments herein, a computer implemented method for dynamically updating an identifier of a receiving device is provided that includes, under control of one or more processors including program instructions to obtain, with the receiving device, a receiving device private key associated with a shared secret. There are also program instructions to obtain, with a receiving device from an electronic device over a network, an electronic device public key associated with the shared secret, and communicate, with the sever, a receiving device public key to the electronic device associated with the shared secret. There are also program instructions to determine, with the receiving device, the shared secret based on the receiving device private key and the electronic device public key, and determine, with the receiving device, an identifier of the receiving device based on the shared secret. There are also program instructions to receive, with the receiving device, a token obtained from a time-based one-time password (TOTP) related to the identifier of the receiving device, and provide a communication path between the receiving device and the electronic device based on the token related to the identifier of the receiving device.

Optionally, the identifier of the receiving device is also based on a determined time period. In one aspect, under the control of the one or more processors including program instructions the method further includes to update, with the receiving device, the identifier of the receiving device to provide an updated identifier after a determined period of time, and receive, with the receiving device, an updated token from the electronic device to the receiving device based on the updated TOTP. In another aspect, under the control of the one or more processors including program instructions the method further includes to provide, with the receiving device, access to the communication path between the receiving device and electronic device based on the updated token.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The phrase "shared secret" as used herein refers to any piece of data, including cryptographic data, provided in a secure communication through a receiving device, including a server, and only known to the electronic device sending the communication and an electronic device receiving the communication. The shared secret may be only known as a result of cryptography, use of security protocols including utilizing an elliptic curve Diffie-Hellman (ECDH) algorithm, hash function, keys, passwords, passcodes, or the like.

The phrase "cryptographic data" as used herein refers to any and all data, information, or the like that is secured as a result of being a shared secret. The cryptograph data can include the passwords, passcodes, logins, hash functions, keys, etc. utilized to secure the shared secret, along with any data, communication, file, document, or the like communicated over a secure communication path formed as a result of using the passwords, passcodes, logins, hash functions, keys, etc.

The term "key" as used herein, refers to a context of data structures used to identify and retrieve data, including cryptograph data. In examples, a key can be a unique identifier, value including integers, letters, etc., hash function, converted into a hash code, word, name, or the like. A key can be utilized to retrieve a shared secret. A key is considered a public key when the key is communicated over an unsecure network. A key is considered a private key when the key is not communicated over an unsecure network. In one example, a private key is inputted into an electronic device by a user.

The phrase "a time-based one-time password" (i.e. TOTP) as used here refers to a unique identifier, value including integers, letters, etc., word, name, etc. that is available to access a secure communication path through a network. Once utilized to secure the communication path the first time, the TOTP will not function again to secure the communication path. The TOTP is also only available for a determined time period before a new TOTP is generated. The determined time period can be thirty seconds, one minute, two minutes, ten minutes, an hour, or the like.

The term "token" as used herein is a single element of a programming language. In example embodiments a token can be a series of bits, keyword, operator, punctuation mark, number, or the like.

The term "obtain" or "obtaining", as used herein in connection with data, including cryptographic data, signals, information and the like, includes at least one of i) accessing memory of a local external device or resource manager where the data, signals, information, etc. are stored, ii) receiving the data, signals, information, etc. over a wireless communications link between the client device and a local external device, and/or iii) receiving the data, signals, information, etc. at a resource manager over a network connection. The obtaining operation, when from the perspective of a client device, may include sensing new signals in real time, and/or accessing memory to read stored data, signals, information, etc. from memory within the client device. The obtaining operation, when from the perspective of a local external device, includes receiving the data, signals, information, etc. at a transceiver of the local external device where the data, signals, information, etc. are transmitted from a client device and/or a resource manager. The obtaining operation may be from the perspective of a resource manager, such as when receiving the data, signals, information, etc. at a network interface from a local external device and/or directly from a client device. The resource manager may also obtain the data, signals, information, etc. from local memory and/or from other memory, such as within a cloud storage environment and/or from the memory of a workstation.

System Overview

Provided is a system in a mesh network that provides a communication path between two electronic devices, where a name of a receiving device, including a server, port of a server, etc. is continuously and dynamically changed based on a shared secret. The name generation and updating is based on the shared secret provided as a result of keys (e.g. public keys and private keys) related to the electronic device identifier, or name. The keys are utilized to derive the shared secret that is unique to each electronic device. In one example, the keys are utilized with an elliptic curve Diffie-Hellman algorithm to determine the shared secret for each electronic device. The derived name can only be utilized for a determined period of time. In particular, a TOTP is provided that is utilized to generate a token to provide access to the communication path.

Figure 1:
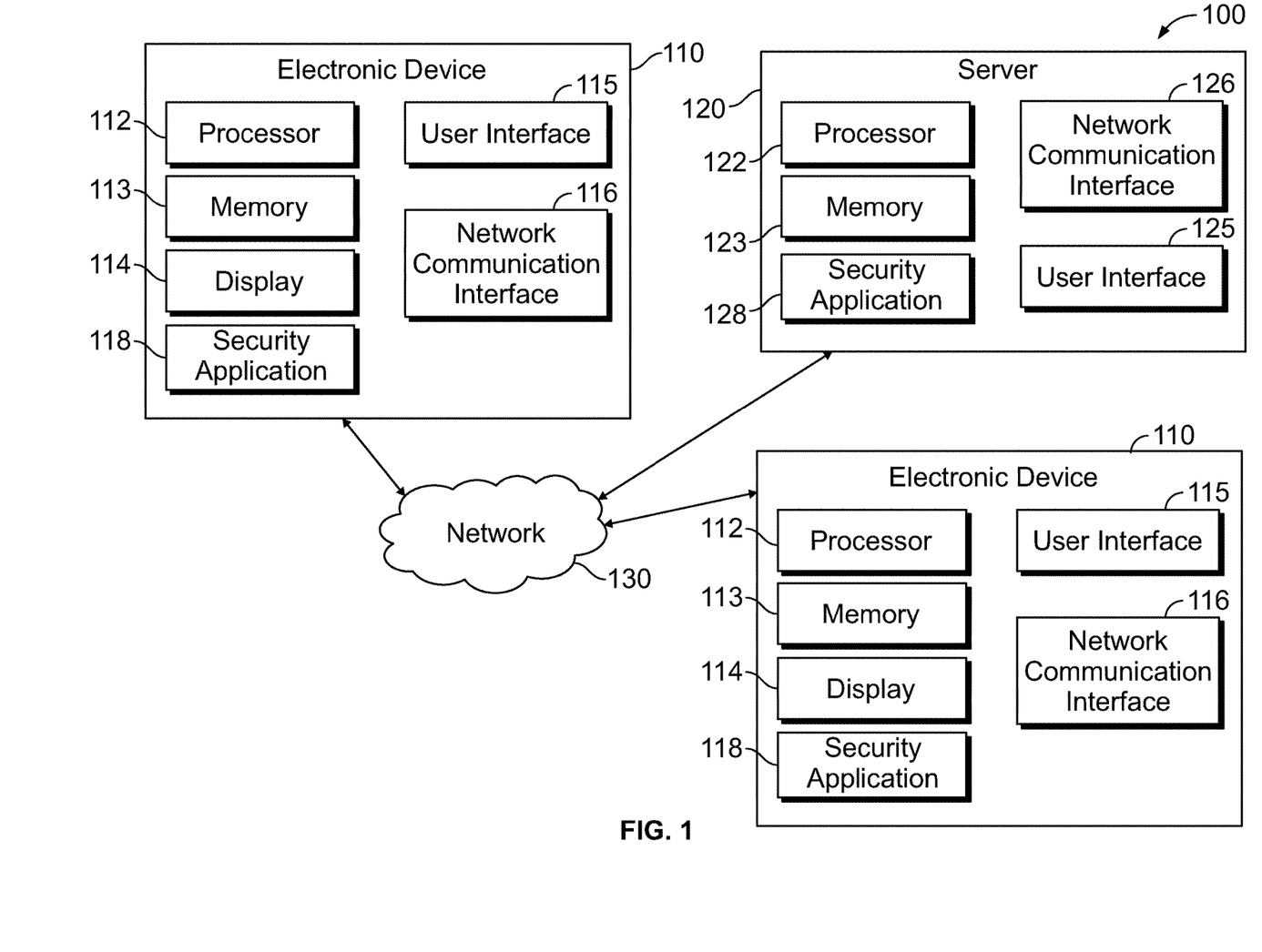
FIG. 1 illustrates a system to dynamically update an identification of a receiving device in accordance with embodiments herein.

FIG. 1 illustrates a system 100 implemented in accordance with embodiments herein for dynamically changing the identification of receiving devices including servers, ports, access point, etc. in a mesh network setting. The system 100 includes one or more electronic devices 110, or client devices, that manage and otherwise provide access to one or more receiving devices 120, where the electronic devices 110, and server 120 communicate through a network 130.

The electronic device 110 may represent various types of electronic devices including, but not limited to, personal computers, tablet devices, laptop computers, embedded appliances (e.g., thermostats, home monitoring systems, and the like), smart watches, medical devices, vehicles, digital assistants, and an entire array of other smart consumer goods. Each electronic device can include one or more processors 112, memory 113, a display 114, a user interface 115, a network communications interface 116, and various other mechanical components, electrical circuits, hardware and software to support operation of the electronic device 110. The memory 113 includes an operating system and instructions to implement the processes described herein. The memory 113 also stores one or more application programs to implement a security application 118.

Each receiving device 120 can represent a server, port of a server, access point, second electronic device, or the like. The receiving device 120 can also include one or more processors 122, memory 123, a network communications interface 126, or port, and a security application 128. The memory in one example may include one or more data stores containing data, information, instructions, videos, photos, software, programs, or the like related to the user and the electronic devices 110. The receiving device 120 may represent a single computer system or a collection of computer systems located at a common location or geographically distributed.

The receiving device 120 and/or the network communication interface 126, or port, can have a receiving device identifier 127 associated therewith that can be continuously, or dynamically updated by the security application 128 utilizing the methods and processes described herein. The receiving device identifier 127 can be a machine friendly name, user friendly name, etc. In one example, the machine friendly name is machine based, and can be fc9cec9e.d6240ec6.df6845a0:7623. Alternatively, a user friendly name is word based, and can be frozen.pier.whisper.76233. In example embodiments, the security application 128 based on a shared secret, and an amount of time, dynamically changes the identifier 127 such that only an electronic device that also can generate the shared second can correctly identify the name of the receiving device at a given time. In one example, the machine friendly name can be changed from a first name fc9cec9e.d6240ec6.df6845a0:76233 to a second name 26069ce4.e8f024c8.197efa47f5:8765. Alternatively, the first name could be changed from frozen.pier.whisper.76233 to a second name hallway.seem.dance:8765. As a result, any hackers attempting to access data, information, etc. of a user from the receiving device 120 is not able to access the receiving device 120 as a result of not having a public key to be able to provide the shared secret. Consequently, an additional layer of security is provided for the receiving device 120 and data, information, etc. on the receiving device 120.

The security application 128 can also communicate with electronic devices 110 through one or more networks 130 to provide access to the data stores of memory. The network 130 may be utilized to communicate a public key, so the electronic device can obtain the identifier 127 of the receiving device 120. The network 130 may represent the World Wide Web, a local area network, a wide area network and the like.

Figure 2:
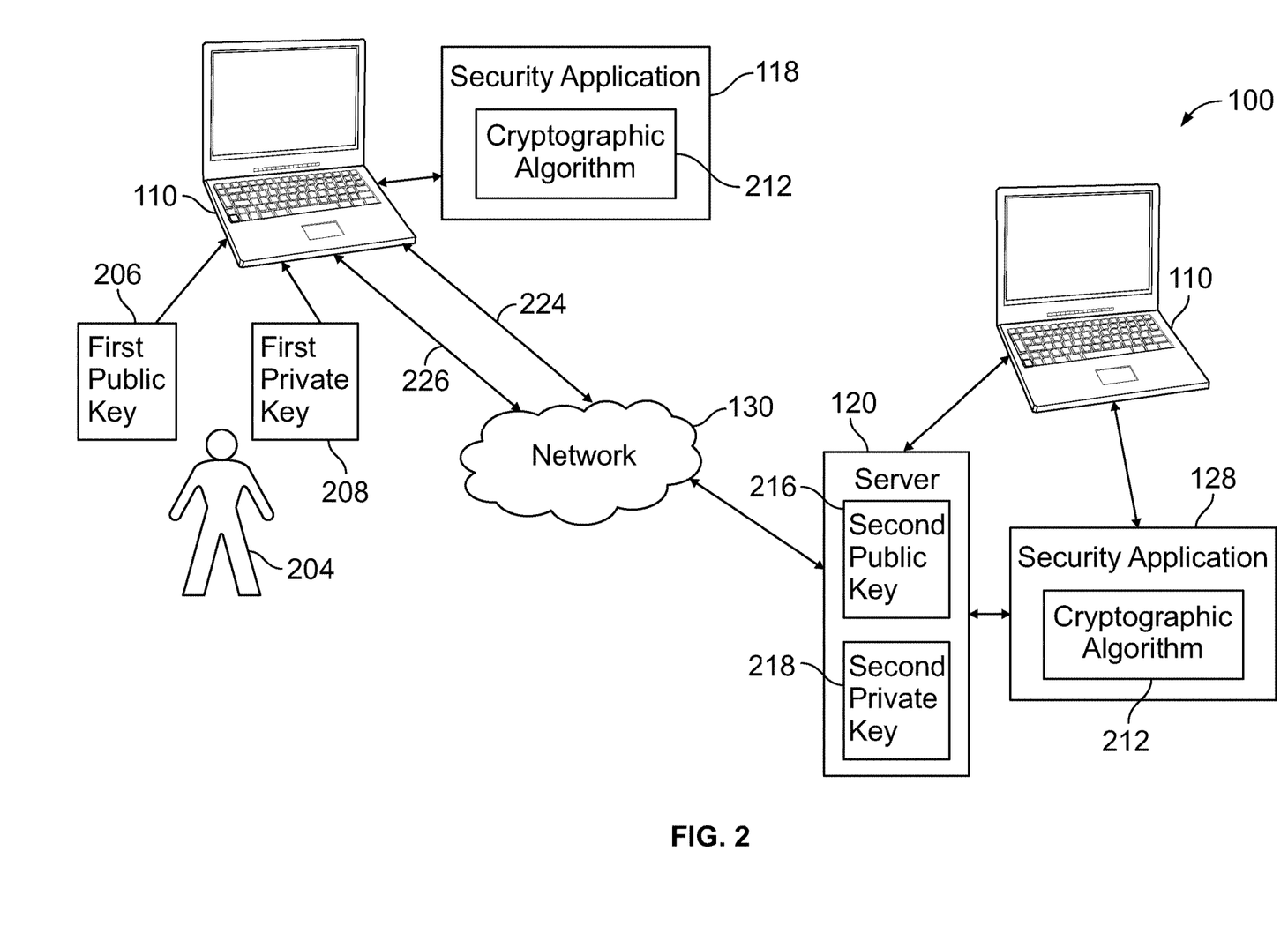
FIG. 2 illustrates a functional diagram of portions of the system of FIG. 1 in accordance with embodiments herein.

FIG. 2 illustrates a functional diagram of portions of the system of FIG. 1 as well as a first example of certain data, information, and content conveyed in accordance with embodiments herein. In particular, in the example embodiment of FIG. 2, the system 100 is implemented as described herein to run the security application 118 on the electronic device 110, and the security application 128 on the receiving device 120. In particular, the electronic device 110 and the receiving device 120 communicate on a periodic basis in order to share a secret. In one example, the secret is provided based on an elliptic curve Diffie-Hellman (ECDH) algorithm.

For example, a user 204 provides a first public key 206 and a first private key 208 to the electronic device 110 to communicate with the receiving device 120 over the network 130. The public key 206 and private key 208 in example embodiments can include a string of numbers, a string of letters, etc. that can be utilized with a cryptographic algorithm 212 to obtain cryptographic data at the receiving device 120. The first public key 206 is considered "public" because the first public key is configured to be communicated through a public network 130 where third parties may have access to the public key, whereas the private key 208 is considered private because the private key 208 is configured to remain at the electronic device 110 and not be communicated over a public network 130. In this manner, the private key 208 is unique to the electronic device 110 and not communicated over a public channel of communication.

The cryptographic data is any data obtained by utilizing the cryptographic algorithm 212 before the data is shared or communicated. Cryptographic algorithms can include Diffie-Hellman algorithms, Rivest-Shamir-Adleman algorithms, asymmetric algorithms, symmetric algorithms, hash functions, secret key algorithms, public key algorithms, data encryption standard algorithms, triple data encryption standard algorithms, advanced encryption system algorithms, or the like. Cryptographic data can include files, documents, passwords, personal information, emails, electronic messages, text messages, videos, pictures, etc. The cryptographic data is stored in the memory of the receiving device 120; however, a user of the electronic device desires the cryptographic data to remain secret.

The receiving device 120 can have a second public key 216 and a second private key 218, along with a cryptographic algorithm 212 and the cryptographic data. Each of the second public key 216 and second private key 218 can be a string of numbers, a string of letters, etc. that can be utilized with a cryptographic algorithm 212 to generate a shared secret that is utilized to gain access to the cryptographic data. Optionally, the first public key 206 and second private key 216 are utilized together by a cryptographic algorithm 212 to generate the shared secret at the receiving device 120. Similarly, the second public key 216 and first private key 208 can be utilized by a cryptographic algorithm 212 to generate the same shared secret at the electronic device 110. The shared secret in example embodiments may be a string of numbers, a string of letters, a string of letters and numbers, or the like. The shared secret in one example is generated by a hash function including 256 bits. In other examples, a hash function, or other algorithm including 16 bits, 32 bits, 64 bits, 128 bits, or the like forms the shared secret. Because the private keys 208, 216 are not communicated over the network 130, along with the shared secret being generated by a cryptographic algorithm 212, a third party is unable to obtain the shared secret.

In the example of FIG. 2, the shared secret is then used in combination with determined time periods for providing a dynamically changing identifier 127 of the receiving device 120 and communication interface (e.g. port(s)), where the identifier 127 is continuously updated over time. Based on the shared secret and a determined time period the security application 118 of the electronic device 110 and the security application 128 of the receiving device 120 generate a time-based one-time password (TOTP) 224 used to access the receiving device 120 or communications interface 126 of the receiving device 120. For example:

val_1=TOTP(*SHA*256(shared secret+time period))

val_2=TOTP(*SHA*256(val_1))

val_3=TOTP(*SHA*256(val_2))

port=TOTP(*SHA*256(val_3))

where val_n and port are the names of the receiving device or communication interfaces generated, SHA256 is a 256 bit hash function derived using the shared secret and the determined time period. The determined time periods can be 10 seconds, a minute, an hour, a day, a week, etc. The TOTP 224 is a password that is generated and can be used during the determined time period to access the receiving device 120 and is representative of the identifier 127. The TOTP 224 can be a domain name, machine friendly name, a user friendly name, or the like. In one example, a machine friendly name can be generated and matched to names in a dictionary, or other source material, to convert the identifier 127 into a user friendly name.

Once the TOTP 224 is used, the determined time period is automatically ended such that the TOTP 224 will not allow access to the receiving device 120 after communication with the receiving device 120 ends. Once communication with the receiving device 120 ends, a new determined time period begins resulting in the generation of a new TOTP 224. In one example, a knock function can be provided to limit the number of attempted entries of the TOTP 224 during the determined period. In one example the number of attempts is five (5), while in another example, the number of attempts is ten (10).

Upon entering the TOTP 224, a token 226 that is based on the identifier 127 of the receiving device 120 is provided for accessing the receiving device 120. The token 226 can be a series of bits that in the example embodiments are representative of the identifier 127. The token 226 in example embodiments includes a length dependent on the identifier 127 of the receiving device or communication interface. Therefore, in one example, the token length is dependent on the dictionary based terms in a user friendly name. Optionally, the token length depends on a machine friendly name. To this end, the token 226 matches the range associated with the name. In this manner, with the token 226 the electronic device 110 may communicate over the public network 130 with the receiving device 120 to obtain and communicate cryptographic data. Because the identifier of the receiving device 120 or receiving device communication interface 126 continuously updates, an additional level of security is provided. To this end, a hacker upon realizing such an extra level of security exists, will be encouraged to spend time attempting to obtain cryptographic data from another receiving device, and/or will become frustrated with attempts to obtain cryptographic data from the receiving device.

Figure 3:
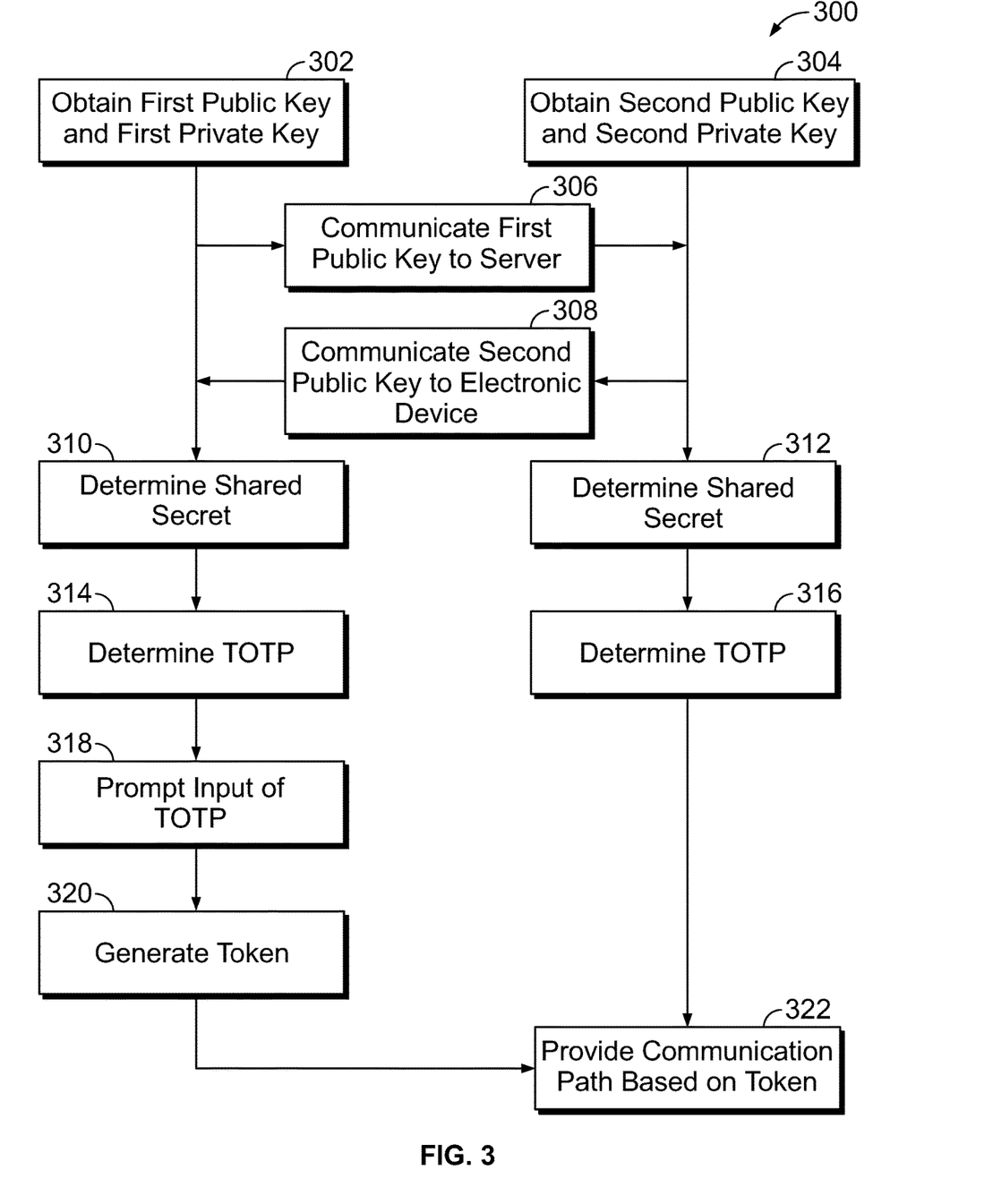
FIG. 3 illustrates a block diagram of an exemplary processes for dynamically update an identification of a receiving device in accordance with embodiments herein.

FIG. 3 illustrates a process 300 for dynamically updating an identifier of a receiving device when communication is desired via a publicly available network. In one example the system of FIG. 1 and/or the system of the functional diagram of FIG. 2 are utilized to implement the process 300 of FIG. 3. To this end, the process may be implemented by one or more processors of an electronic device and/or server by executing instructions stored in a memory, including at least some instructions related to or associated with a security application or the electronic device or receiving device. In example embodiment, the receiving device can be a server, communications interface of a server such as a port, access point, second electronic device, or the like.

At 302, one or more processors of an electronic device obtain a first public key and a first private key associated with a shared secret. In one example, a user inputs the first public key and first private key via a communications interface, input device, or the like. The communication interface can include a USB port, wired connection, wireless connection, communications port, or the like. The input device in example embodiments can include a touch screen, keyboard, mouse, voice activated controller, etc. In one example, a provider provides the first public key and first private key, security application, cryptographic algorithm(s), including hardware and software, etc. to the user. The first public key is configured to be communicated over the network, while the first private key is configured only to remain at the electronic device.

At 304, one or more processors of a receiving device obtain a second public key and a second private key associated with the shared secret. In one example, a provider accesses the receiving device and inputs the second public key and second private key via a communications interface, input device, or the like. The communication interface can include a wired connection, wireless connection, communications port, or the like. The input device in example embodiments can include a touch screen, keyboard, mouse, voice activated controller, etc. In one example, a provider installs the second public key and second private key, security application, cryptographic algorithm(s), including hardware and software, etc. onto the receiving device. The second public key is configured to be communicated over the network, while the second private key is configured only to remain at the electronic device.

At 306, the one or more processors of the electronic device communicate the first public key to the receiving device over the network. In one example, the electronic device prompts the user to communicate the first public key through the network to obtain access to the receiving device. In another example, upon attempting to access the receiving device, the one or more processors of the electronic device automatically communicate the public key through the network to the receiving device.

At 308, the one or more processors, in response to receiving the first public key, communicate the second public key through the network to the electronic device. In one example, the receipt of the first public key at the receiving device starts a determined time period to be utilized in association with the shared secret to generate an identifier for the receiving device.

At 310, the one or more processors of the electronic device determine the shared secret based on the first private key and the second public key. In one example, the first private key and second public key are utilized in a cryptographic algorithm to result in the shared secret. In one example, the cryptographic algorithm is a ECDH algorithm. In other examples the cryptographic algorithm can be a Rivest-Shamir-Adleman algorithm, asymmetric algorithm, symmetric algorithm, hash function, secret key algorithm, public key algorithm, data encryption standard algorithm, triple data encryption standard algorithm, advanced encryption system algorithm, or the like. The shared secret in one example is a string of numbers. In another embodiment the shared secret is a string of letters. In yet another example, the shared secret is a string of numbers and letters. In other examples, the string includes 1024 characters, 512 characters, 256 characters, 128 characters, etc.

At 312, the one or more processors of the receiving device determine the shared secret based on the second private key and the first public key. In particular, as the one or more processors of the electronic device determine the shared secret, so do the one or more processors of the receiving device. In shared secret can be determined, derived, etc. in any manner, including as described in relation at 310.

At 314, the one or more processors of the electronic device determine a TOTP related to an identifier of the receiving device. Based on the shared secret and determined time period, a cryptographic algorithm, hash function, etc. can generate the identifier. In one example, the identifier is a machine friendly identifier. In another example, the machine friendly identifier is converted into a user friendly identifier. To provide the conversion, the TOTP is associated with a source material, such as a dictionary, to modify the TOTP to generate a user friendly identifier.

At 316, the one or more processors of the receiving device determine a TOTP related to the identifier of the receiving device. Based on the shared secret and determined time period, a cryptographic algorithm, hash function, etc. can generate the identifier. In one example, the identifier is a machine friendly identifier. In another example, the machine friendly identifier is converted into a user friendly identifier. To provide the conversion, the TOTP is associated with a source material, such as a dictionary, to modify the TOTP to generate a user friendly identifier. In example embodiment, the TOTP may be communicated to the user via an electronic message, text message, presented on an output screen, communicated to a different electronic device of the user, or the like.

At 318, the one or more processors of the electronic device prompt the user to input the TOTP. The prompt in one example is a prompt box requesting the TOTP be typed into the prompt box. Optionally, the prompt may include a knock, or number of attempts to accurately input the TOTP. The number of attempts may be three, five, ten, twenty, etc. If a user is unable to provide the correct TOTP in the number of attempts, the prompt will no longer allow additional attempts. In one example, no additional attempts are allowed for a determined period of time. In another example, a provider, or third party, must be contacted to allow additional attempts. In yet another example, an electronic message, text message, etc. is automatically communicated to another electronic device of the user, and/or a third party service provider to communicate that the TOTP attempts have failed. In this manner, if an undesired third party gains access to the electronic device of the user and is attempting to guess at the TOTP, the user and/or third party provider are alerted.

At 320, the one or more processors of the electronic device generate a token associated with the identifier based on the TOTP. The token is configured to be of a length or range associated with the identifier, including a machine friendly name, user friendly name, or the like. The token is configured to be communicated through the network to gain access to the receiving device.

At 322, the one or more processors of the receiving device receive the token and in response provides a communication path through the network between the receiving device and the electronic device. In particular, without receiving the token, the receiving device does not allow the electronic device to access any cryptographic data secured within a database, memory, etc. of the receiving device. In this manner, only an individual with the first public key can access the receiving device. In addition, by dynamically updating the identifier of the receiving device, a hacker can no longer take advantage of a static receiving device name in attempting to obtain user cryptographic data, improving security for the user.

Closing Statements

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method, or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices, and program products according to various example embodiments. These program instructions may be provided to a processor of a general-purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting, and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming.

The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B. For the avoidance of doubt, the claim limitation "associated with one or more of the client device and a user of the client device" means and shall encompass i) "associated with the client device", ii) "associated with a user of the client device" and/or iii) "associated with both the client device and a user of the client device". For the avoidance of doubt, the claim limitation "one or more of touch, proximity sensing, gesture or computer vision" means and shall encompass i) "touch", ii) "proximity", (iii) "sensing", (iv) "gesture", and/or (iv) "computer vision" and any sub-combination thereof.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer implemented method for providing a communication path comprising:
under control of one or more processors including program instructions to:
determine, with a receiving device, a shared secret based on a receiving device private key and an electronic device public key of an electronic device communicated to the receiving device over a network;
determine, with the electronic device, the shared secret based on an electronic device private key and a receiving device public key communicated to the electronic device over the network;
determine, with the receiving device, an identifier of the receiving device based on the shared secret;
determine, with the electronic device, a time-based onetime password (TOTP) based on the shared secret;
obtain a token based on the TOTP;
communicate the token from the electronic device to the receiving device based on the identifier;
provide a communication path between the receiving device and the electronic device based on the token; and
update, with the receiving device, the identifier of the receiving device to provide an updated identifier after a determined period of time.

2. The method of claim 1 wherein the identifier of the receiving device is also based on a determined time period.

3. The method of claim 1, wherein under the control of the one or more processors including program instructions further to:
obtain, with the receiving device, the receiving device private key associated with the shared secret;
obtain, with the electronic device, an electronic device private key associated with the shared secret;
obtain, with the receiving device from an electronic device over the network, the electronic device public key associated with the shared secret; and
obtain, with the electronic device from the receiving device over the network, the receiving device public key associated with the shared secret.

4. The method of claim 1, wherein under the control of the one or more processors including program instructions further to:
determine, with the electronic device, an updated TOTP based on the updated identifier of the receiving device; and
communicate an updated token from the electronic device to the receiving device based on the updated TOTP.
provide an updated communication path between the receiving device and electronic device based on the updated token.

5. The method of claim 4, wherein under the control of the one or more processors including program instructions further to:
repeat the update step.

6. The method of claim 1, wherein to determine, with the receiving device, an identifier of the receiving device based on the shared secret includes generating a machine based name.

7. The method of claim 1, wherein to determine, with the receiving device, an identifier of the receiving device based on the shared secret includes associated the shared secret with terms in a dictionary, and generating a word based name.

8. The method of claim 1, wherein to obtain the token based on the TOTP include providing a threshold number of attempts to input the TOTP to obtain the token.

9. A system, comprising:
an electronic device comprising:
a user interface;
a memory storing program instructions;
one or more processors that, when executing the program instructions, are configured to:
determine a shared secret based on an electronic device private key of the electronic device and a receiving device public key of a receiving device communicated to the electronic device over a network;
generate a token from an identifier of the receiving device based on the shared secret;
communicate the token to the receiving device;
the receiving device comprising:
a memory storing program instructions;
one or more processors that, when executing the program instructions, are configured to:
determine, the shared secret based on a receiving device private key and an electronic device public key communicated to the receiving device over the network;
determine the identifier of the receiving device based on the shared secret;
provide a communication path through the network between the receiving device and the electronic device based on receiving the token;
update the identifier of the receiving device to provide an updated identifier after a determined period of time.

10. The system of claim 9, wherein the identifier of the receiving device is also based on a determined time period.

11. The system of claim 9, wherein the identifier of the receiving device is at least one of a name of the receiving device, or a name of a port of the receiving device.

12. The system of claim 9, wherein the identifier is at least one of machine based, or word based.

13. The system of claim 9, the one or more processors of the electronic device further configured to:
obtain an electronic device private key associated with the shared secret; and
obtain from the receiving device over the network the receiving device public key associated with the shared secret.

14. The system of claim 9, the one or more processors of the receiving device further configured to:
obtain the receiving device private key associated with the shared secret; and
obtain from an electronic device over the network the electronic device public key associated with the shared secret.

15. The system of claim 9, the one or more processors of the electronic device further configured to:
determine an updated TOTP based on the updated identifier of the receiving device; and
communicate an updated token from the electronic device to the receiving device based on the updated TOTP.

16. A computer implemented method for dynamically updating an identifier of a receiving device comprising:
under control of one or more processors including program instructions to:

obtain, with the receiving device, a receiving device private key associated with a shared secret;

obtain, with the receiving device from an electronic device over a network, an electronic device public key associated with the shared secret;

communicate, with a server, a receiving device public key to the electronic device associated with the shared secret;

determine, with the receiving device, the shared secret based on the receiving device private key and the electronic device public key;

determine, with the receiving device, an identifier of the receiving device based on the shared secret;

receive, with the receiving device, a token obtained from a time-based one-time password (TOTP) related to the identifier of the receiving device;

provide a communication path between the receiving device and the electronic device based on the token related to the identifier of the receiving device;

update, with the receiving device, the identifier of the receiving device to provide an updated identifier after a determined period of time.

17. The method of claim 16, wherein the identifier of the receiving device is also based on a determined time period.

18. The method of claim 16, wherein under the control of the one or more processors including program instructions further to:

receive, with the receiving device, an updated token from the electronic device to the receiving device based on the updated TOTP.

19. The method of claim 18, wherein under the control of the one or more processors including program instructions further to:

provide, with the receiving device, access to the communication path between the receiving device and electronic device based on the updated token.

* * * * *